Dec. 7, 1965  F. E. BROWN  3,221,939
DISPOSABLE DISPENSERS
Filed Jan. 8, 1962
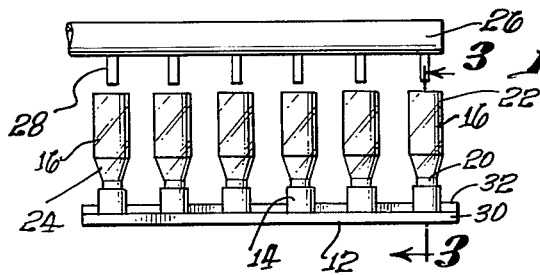
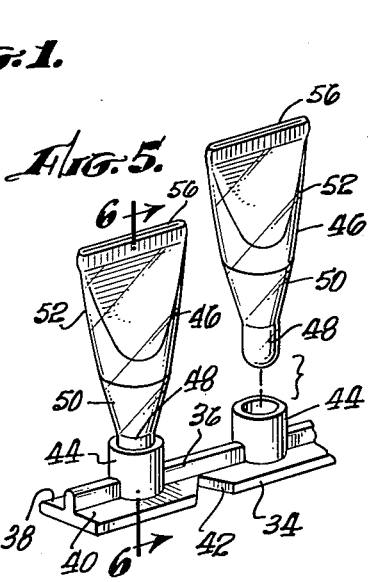
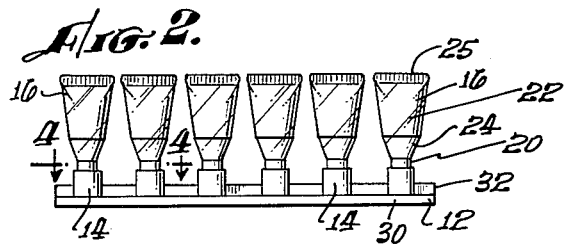
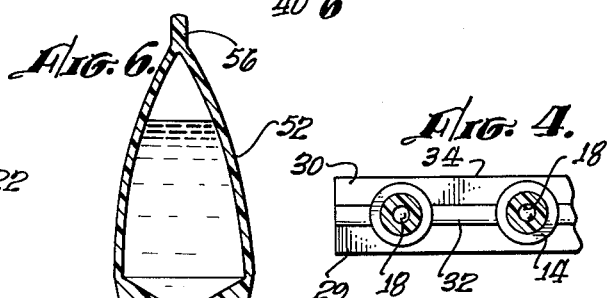
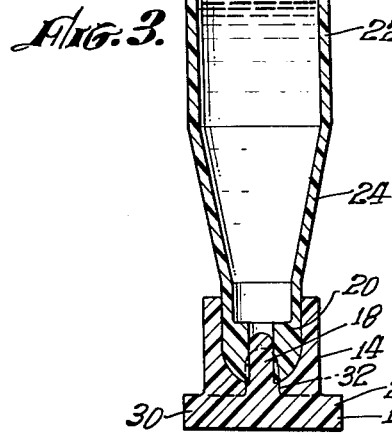
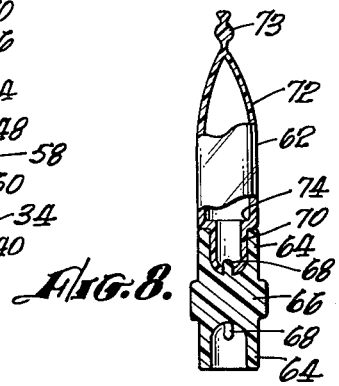
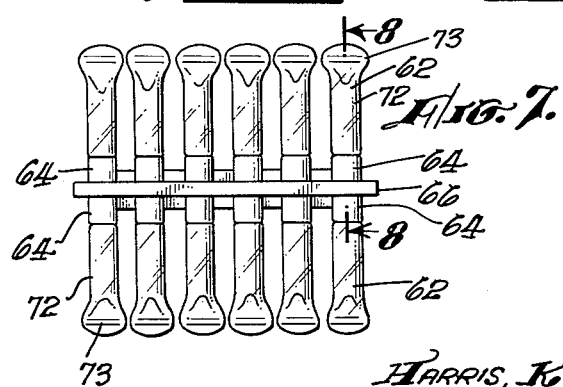
Frank E. Brown,
INVENTOR.
BY HIS ATTORNEYS.
Harris, Kiech, Russell & Kern.

United States Patent Office 3,221,939
Patented Dec. 7, 1965

3,221,939
DISPOSABLE DISPENSERS
Frank E. Brown, Glendale, Calif., assignor to Barnes-Hind International, Inc., a corporation of California
Filed Jan. 8, 1962, Ser. No. 164,711
8 Claims. (Cl. 222—94)

This invention relates to liquid dispensing and, more particularly, to a device especially suitable for storing and dispensing small unit doses of liquid and to a method of filling a plurality of such storage-dispensing devices.

There are many applications where it would be desirable to market liquid products in small metered lots or dosages contained in disposable unit dispensers. The pharmaceutical industry, for instance, packages nasal, eye, and ear drops in bottles containing many unit dosages, with a dropper means or other suitable device being provided to assist the user in dispensing a unit dosage. It will be appreciated that such a storage and dispenser means is inherently wasteful, sometimes lacking in hygiene, and frequently results in the patient using far more than necessary or too little of the medication. Sometimes a pharmaceutical composition contains a material that is highly reactive with oxygen and, to guard against oxidation, an oxidation inhibitor will be incorporated in the composition and the user cautioned to avoid unnecessary and prolonged exposure of the contents of the container to the atmosphere. The device of the invention permits the marketing and the dispensing of liquid pharmaceutical products or other liquids in individual or small unit doses and in a hygienic form which minimizes waste and exposure to the oxygen of the air.

In addition to the pharmaceutical industry, there are many other applications where it is desirable to package liquids in disposable unit dispensers; for example, instrument oil, food coloring, food flavoring, dyes and inks, dermatological salves, and the like.

It is therefore a principal object of the invention to provide an apparatus for storing and dispensing small quantities of liquids. In a preferred form, the apparatus of the invention includes a base strip having a plurality of side-by-side sockets and a plurality of small single-dose squeezable storage-dispensing units, each having an apertured neck sized to be retained frictionally in one of the sockets. It is an object of the invention to provide such a combination.

A still further object of the invention is to provide a storing and dispensing apparatus that will provide regulated and metered amounts of liquid, a device requiring no effort or skill on the part of the user in obtaining an exact quantitative volume of the liquid. Another object of the invention is to provide a storing and dispensing device for small unit doses of liquid that will minimize, if not substantially eliminate, any wastage.

Another object of the invention is to provide a sanitary means for storing and dispensing small unit doses of liquid, this being achieved in the apparatus of the invention by providing a plurality of small single-dose squeezable storage-dispensing units that may be disposed of after a single use.

Another object of the invention is to provide a means for storing and dispensing oxygen-sensitive liquids that will minimize or substantially eliminate opportunity for oxidation. Unlike conventional packaging, wherein the contents of a storage and dispensing container, for example, an eyedrop bottle, is repeatedly exposed to the oxygen of the air, the small single-dose squeezable storage-dispensing units of the apparatus of the invention only once permits exposure of the liquid and that at time of use. The storage and dispensing apparatus of the invention will, in some applications, do away with the need of oxidation inhibitors or significantly reduce the amount heretofore used.

In a preferred form of the invention, the aperture of the neck of the single-dose squeezable storage-dispensing unit is sized to cooperate with the surface tension of the liquid to forestall free flow of the liquid from the unit in the absence of squeezing. It is an object of the invention to provide such a structure.

In another embodiment of the invention, the sockets are provided with outwardly-extending sealing pins centrally located on their respective bases. The sealing pin of each socket is sized to fit snugly into the aperture of the neck of the respective dispensing unit. In this fashion the several sealing pins provide positive seals for the respective dispensing units. It is an object of the invention to provide such a structure.

The base strip which supports the plurality of side-by-side sockets is preferably formed of a pliable plastic such as polyethylene. A base strip including sockets made of polyethylene provides effective seals between the necks of the individual storage-dispensing units and the walls of respective sockets in which they are seated. The plastic sockets effectively hold the storage-dispensing units against withdrawal, even under flexing of the apparatus, and act as stabilizers for the individual storage-dispensing units. The individual storage-dispensing units are preferably formed of a pliable thermoplastic resin such as polypropylene.

The storage-dispensing units in their unfilled form preferably have an open end opposite the apertured neck. In filling of the units of the invention, the necks of a plurality of storage-dispensing units are respectively seated in individual sockets of the base strip in sealing relationship with the several apertures. The several storage-dispensing units are simultaneously filled through their respective open ends with equal volumes of liquid. Thereafter, the open ends of the several units are flattened and sealed without removing the several units from their respective sockets.

The foregoing objects and advantages of the invention, together with various other objects and advantages, will become evident to those skilled in the art in light of the following disclosure and drawing. The drawing illustrates and the disclosure describes preferred embodiments of the apparatus of the present invention.

In the drawing:

FIG. 1 is an elevational view of a preferred embodiment of the apparatus of the invention with several small single-dose storage-dispensing units, respectively positioned beneath outlets of a filling header;

FIG. 2 is another elevational view of the apparatus of FIG. 1 with the ends of the several storage-dispensing units closed following filling;

FIG. 3 is a longitudinal sectional view taken along line 3—3 of FIG. 1, illustrating in detail the structure of one of the storage-dispensing units and a socket of a base strip in which it is mounted;

FIG. 4 is a fragmentary plan view taken along line 4—4 of FIG. 2, with the storage-dispensing units removed to more clearly illustrate the sockets and base strip;

FIG. 5 is a fragmentary isometric view of another embodiment of the apparatus of the invention employing a different type of storage-dispensing units and a notched base strip;

FIG. 6 is a longitudinal sectional view taken along line 6—6 of FIG. 5;

FIG. 7 is an elevational view of still another embodiment of the apparatus of the invention wherein the base strip supports on its opposite sides separate rows of spaced sockets, each socket serving to retain frictionally the neck of a storage-dispensing unit; and FIG. 8 is a longitudinal sectional view taken along line 8—8 of FIG. 7 illustrating the storage-dispensing unit of that figure and its manner of seating in the socket of the base strip.

The apparatus of the invention designed for storing and dispensing small unit doses of liquids, as best seen in FIG. 2, includes an elongated base strip 12, T-shaped in cross section, having a plurality of side-by-side sockets 14 and an equal number of small single-dose squeezable storage-dispensing units or tubes 16 positioned in the respective sockets. The storage-dispensing units 16 are preferably made of polypropylene and the elongated strip 12 of polyethylene.

The base strip 12, as mentioned, has a T cross section which comprises two outwardly-extending and aligned arms 29 and 30 and a web 32 disposed at right angles to the two arms at their respective intersections. The sockets 14 are preferably formed integrally with the base strip 12 proper and are located astraddle the web 32 with their respective bases merging into the upper surface of the two arms 29 and 30. Each of the several sockets 14 of the base strip 12 has an outwardly-extending sealing pin 18 (FIGS. 3 and 4) centrally located and perpendicular to its base.

Each of the storage-dispensing units 16 is generally tubular and is provided with an apertured neck 20. The neck 20 is substantially cylindrical and is sized to be retained frictionally in one of the sockets 14. The neck 20 is joined to a generally tubular element 22 by a tapered portion 24 (FIG. 3) which progressively increases in cross section from neck to tubular element 22. The tubular element 22 at its end opposite the apertured neck 20 is flattened and sealed to form a closure 25 (FIG. 2) which is parallel to the base strip 12 and of a length slightly less than the center-to-center spacing of the sockets 14. The tubular elements 22 of the storage-dispensing units 16 illustrated in FIGS. 1 and 3 have not yet been closed, they initially having open ends to permit the filling of the units with liquid provided by an elongated header 26 which has a plurality of downspouts 28, equal in number to the number of storage-dispensing units to be filled (FIG. 1). Following filling, the tubular elements 22 are closed by heat sealing accomplished under pressure with a pair of heated mandrels or the like.

The bottoms of the several sockets 14 are rounded from the sealing pins 18 to the perpendicular inner walls of the sockets. Each of the necks 20 of the respective storage-dispensing units 16 has a complementary outer surface to engage and seal against the rounded bottom and inner wall of the socket in which it is frictionally held. In preparation for filling, the single-dose storage-dispensing units are individually placed in the sockets 14 to assume the position illustrated in FIGS. 1 and 3. The sealing pin 18 of each of the several sockets 14 is sized to fit snugly into the aperture of the neck of the unit positioned in its socket. The sealing pin 18 provides a positive seal, adding to the complementary sealing surfaces of the socket and the neck of the storage-dispensing unit.

The dimension of the aperture of the neck 20 is preferably of such size that the surface tension of the liquid placed in the unit will forestall free flow of the liquid from the unit in the absence of squeezing of such unit. This preferred relationship of surface tension of the liquid and size of the aperture in effect provides another seal for the storage-dispensing unit.

The socket 14, in addition to providing a seal, holds the storage-dispensing unit against withdrawal when the structure is flexed and acts as a stabilizer for the individual storage-dispensing unit disposed therein. The flexing of the storage-dispensing unit may cause some flexing of the socket walls, but this does not cause the sealing action of the sealing pin 18 to become any less effective.

Most commonly the storage-dispensing unit will be fabricated to hold from 0.2 to 1 cubic centimeter of liquid. For a liquid having approximately the viscosity of water, there are 20 drops in a cubic centimeter. In using the storage and dispensing apparatus of the invention, a single one of the single-dose squeezable storage-dispensing units is removed at the time of use. The tubular element 22 of the unit 16 is squeezed to expel several drops, shaken, and then squeezed to remove more drops, this being repeated until the unit is exhausted of its contents.

For some applications, it is desirable to incorporate a dye in the plastic of the storage-dispensing unit to protect the liquid contents against the harmful effect of certain wave lengths of light.

The embodiment of the apparatus of the invention illustrated in FIGS. 5 and 6 differs principally from that earlier described in having a somewhat different form of storage-dispensing unit and a notched base strip 34. Strip 34, like the strip earlier described, has a T cross section comprising an upwardly reaching web 36 and two aligned outwardly extending arms 38 and 40 at the base of the web. The arms 38 and 40 have aligned notches 42 between adjoining sockets 44 for the purpose of selective disjoining of sockets from the base strip proper. Where this notched base strip is employed, it is generally more desirable to use a somewhat less flexible plastic for the fabricating of the base strip. Styrene and butyrate plastics may be used for this purpose.

The storage-dispensing unit 46 of the embodiment of FIGS. 5 and 6 differs principally from that earlier described in having a relatively thick wall for both its neck 48 and tapered portion 50, which progressively increases in cross section from the neck to a tubular element 52. The neck 48 and tapered portion 50 have a common aperture 54 of the same diameter running substantially the length of the two portions which aperture opens into the interior of the tubular element 52. The end of the tubular element 52 opposite the neck 48 is heat sealed as before to provide a strip closure 56. The formation of the strip closure 56 brings opposed sides of the tubular element together and imparts a varying cross section to the tubular element 52 for most of its length, as best seen in FIGS. 5 and 6 with the cross section varying from substantially rectangular near the closure 56 to substantially circular near the tapered portion 50. The aperture 54 of the neck 48 is sized to snugly receive an upwardly projecting sealing pin 58 of socket 60 of the base strip.

The embodiment of FIGS. 7 and 8 includes two opposing rows of storage-dispensing units 62 positioned in spaced sockets 64 arranged along the length and opposite sides of a base strip 66. The base strip 66 in transverse section is generally cross-shaped between adjoining sockets 64. The sockets 64 have the same general configuration of those described in FIGS. 1–6, each being provided with a centrally located outwardly reaching sealing pin 68 at the base of the socket. Each of the storage-dispensing units of the embodiment of FIGS. 7 and 8 has a neck portion 70 which is connected directly to a tubular element 72 by an outwardly flared shoulder 74. The outer wall of the shoulder 74 (FIG. 8) engages the upper surface of the socket 64. The neck portion 70 and the interior wall of the socket 64 have complementary surfaces which provide an effective seal, working together with the sealing pin 68 which snugly fits into an aperture in the neck wall.

The storage-dispensing unit of FIG. 8 may be filled in the manner described above through an open, unsealed end of the tubular element 72 which is later heat sealed under pressure to provide a sealing strip 73. The sealing strip 73 has a somewhat different configuration than that of the storage-dispenser unit of FIG. 2 in being longer and having opposed boss areas on opposite sides of the strip. The strip may be conveniently grasped in removing a unit from its respective socket 64. The configuration of the sealing strip 73 is a desirable feature of the invention and its use avoids the hazard of squeezing out a portion of the contents during removal which might occur if removal is made by grasping the tubular element 72. By selection of suitable heat sealing mandrels the configuration of the sealing strip 73 may be somewhat varied.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:
1. In an apparatus for storing and dispensing small unit doses of liquid, the combination of: a base strip and a plurality of side-by-side sockets integrally formed with and spaced along the length of said strip, said base strip having a T cross section comprising two outwardly extending and aligned arms and a web at the intersection of the arms and disposed at a right angle thereto with the arms of the base strip being notched between adjoining sockets for selective disjoining of sockets therefrom, said sockets being disposed on the web side of the aligned arms; and a plurality of small single-dose squeezable storage-dispensing units, each having an apertured neck sized to be retained frictionally in one of said sockets.

2. In an apparatus for storing and dispensing small unit doses of liquid, the combination of:
 a base strip having a plurality of side-by-side sockets, said sockets having rounded bottoms sloping inwardly and downwardly from all sides and protruding cylindrical sealing pins located centrally of said rounded bottoms; and
 a plurality of small single-dose squeezable storage-dispensing units, each having an apertured neck sized to be retained frictionally in one of said sockets with a complementary rounded end surface of the respective neck in sealing engagement against the rounded bottom of the socket and with the sealing pin fitting snugly into the aperture upon positioning of the storage dispensing unit in the socket.

3. In an apparatus for storing and dispensing small unit dose of liquid, the combination of:
 a base strip having a plurality of side-by-side sockets, said sockets having rounded bottoms and protruding sealing pins located centrally of said rounded bottoms; and
 a plurality of small single-dose squeezable storage-dispensing units, each having an apertured, cylindrical neck sized to be retained frictionally in one of said sockets with a complementary rounded end surface of the respective neck in sealing engagement against the rounded bottom of the socket and with the sealing pin fitting snugly into the aperture upon positioning of the storage dispensing unit in the socket, and with each of said storage-dispensing units including a squeezable tubular element joined integrally with said neck by a tapered portion, said aperture extending through the neck and the tapered portion and opening into the tubular element.

4. An apparatus for storing and dispensing a small unit of liquid, said apparatus comprising:
 a closure including a socket having a rounded bottom and a protruding sealing pin located centrally of said rounded bottom; and
 a squeezable storage-dispensing unit having an apertured, cylindrical neck sized to be retained frictionally in the socket of the closure with a complementary rounded end surface of the neck being in sealing engagement against the round bottom of the socket and with the sealing pin fitting snugly into the aperture upon positioning of the storage dispensing unit in the socket, and with said storage-dispensing unit including a squeezable tubular element joined integrally with said neck by a tapered portion, said aperture extending through the neck and the tapered portion and opening into the tubular element.

5. An apparatus for storing and dispensing small unit doses of liquid as defined in claim 3 wherein the aperture of the neck is sized to cooperate with the surface tension of the liquid to forestall free flow of the liquid from the storage-dispensing unit in the absence of squeezing of said unit.

6. An apparatus for storing and dispensing a small unit of liquid, said apparatus comprising:
 a closure including a socket having a rounded bottom sloping inwardly and downwardly from all sides and a protruding cylindrical sealing pin located centrally of said rounded bottom; and
 a squeezable storage-dispensing unit having an apertured neck sized to be retained frictionally in the socket of the closure with a complementary rounded end surface of the neck being in sealing engagement against the round bottom of the socket and with the sealing pin fitting snugly into the aperture upon positioning of the storage dispensing unit in the socket.

7. An apparatus for storing and dispensing a small unit dose of liquid as defined in claim 4 wherein the aperture is sized to cooperate with the surface tension of the liquid to forestall free flow of the liquid from the storage-dispensing unit in the absence of squeezing of said unit.

8. In an apparatus for storing and dispensing small unit doses of liquid, the combination of:
 a base strip and a plurality of side-by-side sockets spaced along the length of said strip, said base strip having a T cross section comprising two outwardly extending and aligned arms and a web at the intersection of the arms and disposed at a right angle thereto, with the several sockets being integrally formed with and disposed on the web-side of the aligned arms, each of said sockets having a rounded bottom and a protruding sealing pin located centrally of said rounded bottom; and
 a plurality of small single-dose squeezable storage-dispensing units, each having an apertured neck sized to be retained frictionally in one of said sockets with a complementary rounded end surface of the neck being in sealing engagement with the rounded bottom of the socket in which said neck is disposed.

References Cited by the Examiner

UNITED STATES PATENTS

| | | | |
|---|---|---|---|
| 2,134,489 | 10/1938 | Scherer | 222—107 |
| 2,819,792 | 1/1958 | Margulis. | |
| 2,884,150 | 4/1959 | Weichselbaum et al. | |
| 2,958,169 | 11/1960 | Flax | 53—37 |
| 3,001,673 | 9/1961 | Brown | 222—107 |
| 3,041,801 | 7/1962 | Harrison | 53—37 |
| 3,059,766 | 10/1962 | Jordt | 206—63.2 |

FOREIGN PATENTS 677,592  8/1952  Great Britain.

LOUIS J. DEMBO, *Primary Examiner.*

LAVERNE D. GEIGER, *Examiner.*